United States Patent Office 3,764,454
Patented Oct. 9, 1973

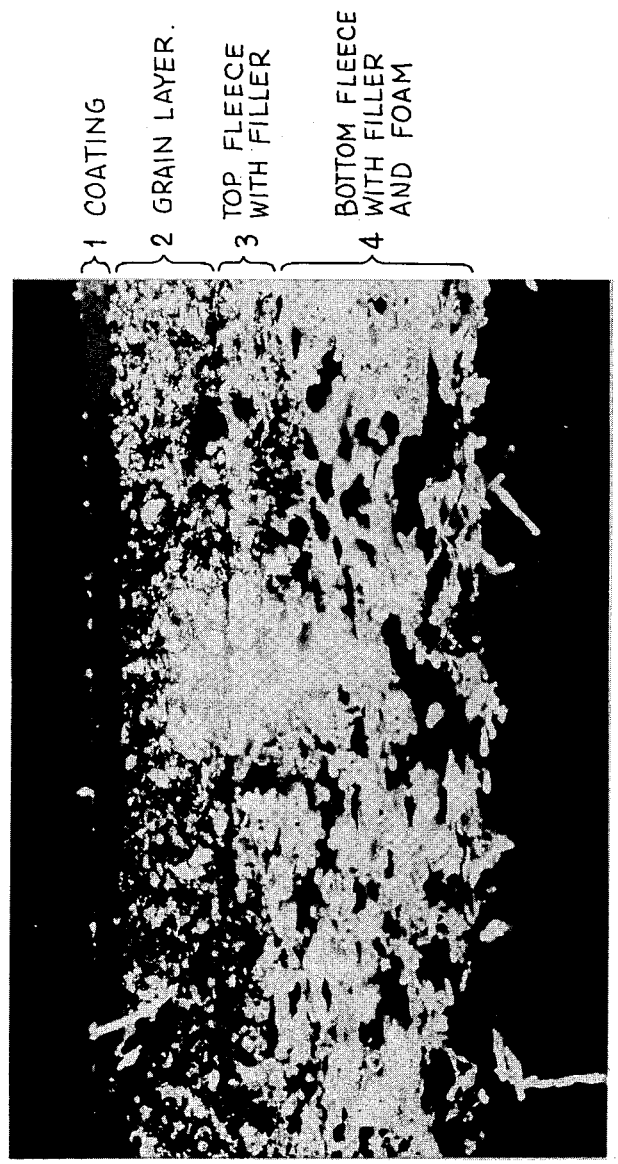

3,764,454
SUPPLE FIBROUS SHEET
Lawrence W. Healy, Johnsonville, S.C., and Wu Lan Wang, Newark, and Joseph I. Gross, Short Hills, N.J., assignors to Tenneco Chemicals, Inc., New York, N.Y.
Continuation-in-part of application Ser. No. 719,219, Apr. 5, 1968. This application Nov. 13, 1970, Ser. No. 89,223
Int. Cl. B32b 3/26, 7/02, 7/08
U.S. Cl. 161—159
15 Claims

ABSTRACT OF THE DISCLOSURE

Leather replacement products are prepared by needling a fleece into a polyurethane foam, needling a second fleece onto the resulting web and depositing a polyurethane elastomer into the void spaces and interstices of the resulting products.

RELATED APPLICATION

This invention in some of its aspects relates to improvements in the invention described in copending patent application Ser. No. 562,532, filed July 5, 1966, now abandoned. It is a continuation-in-part application of copending application Ser. No. 719,219, filed Apr. 5, 1968, now abandoned and of copending application Ser. No. 49,964, filed June 25, 1970 now abandoned which in turn is a divisional application of application Ser. No. 719,219.

BACKGROUND OF INVENTION

This invention relates to novel, supple, fibrous sheet compositions and to processes for making the same. More particularly, it relates to sheets possessing the desirable properties of natural leather.

Natural leather has found wide use in decorative and functional products because of its desirable qualities such as appearance, ability to absorb or transmit moisture vapor, suppleness, accommodation, tensile strength, tear strength, plasticity, set, abrasion resistance, transpiration, etc. However, a number of problems are associated with natural leather. Leather is a natural product and therefore exhibits wide variations in quality, size, etc. It also does not possess a desirably high resistance to chemical and biological attack as well as to deterioration caused by heat or by abrasion, flexing and other mechanical stresses.

To avoid these drawbacks of natural leather, it has been proposed to produce synthetic, supple sheet compositions to replace leather in such area as shoes, clothing, pocketbooks, upholstery, industrial belting, sporting goods, decorative items, and the like. Such products as have been proposed are essentially laminates of two or more layers of various substances, and while they are capable of emulating the properties of leather in one or more respects, they are deficient in others. More importantly, they do not have the desirable balance of physical and chemical properties inherent in natural leather which makes the natural product suitable for such a wide variety of uses. Thus, synthetic products which have heretofore been prepared may be equal or even superior to natural leather in one or more properties such as tear strength, but deficient in other properties such as breathability, moisture transmission, wet strength, plasticity, set, tear resistance, and puncture resistance. Moreover, since they are laminates, they are subject to fracture at the interface of the layers.

One of the principal reasons for these deficiencies in synthetic products is that they fail to reproduce the structure and properties of natural leather which is not a laminate. Natural leather comprises an interlocking system of fibers or fiber bundles running through its entire thickness. The fibers are free to move slightly in any direction to neutralize applied stresses. Because of the three dimensional interweaving, in contrast to laminated structures of synthetic products, natural leather is substantially free of weak layers. Additionally, it has good tear and puncture resistance.

Other features of natural leather which are not reproduced in synthetic products are the properties of gradient density and gradient compressibility. Natural leather has a gradient density which increases from the inner or flesh side to the outer or grain side. The whole structure is compressible. The less dense portion, or corium, is relatively more compressible than the grain side. As a result, when leather is formed around the stress points of the last in shoe making, the stress is taken up in the inner segment of the leather body. As a consequence of this neutralization of stresses, the dimensional changes in the leather caused by the lasting operation do not manifest themselves as surface distortions or wrinkles. Such leather substitutes as are presently available do not have the properties of gradient density and compressibility and shoes prepared from them are often marred by surface defects, especially in high stress areas such as the heel or the toe.

In natural leather most of the fibers are long, thin and highly flexible. This flexibility would be lost if there were a rigid cementing substance between the fibers, as is the case with wood. Natural leather is substantially devoid of rigid cementing substance between the fibers. Instead, the fibers are separated by a relatively soft, resilient fatty substance which holds the fibers apart, but does not prevent their restricted movement within the body of the leather. Thus, the fibers retain their flexibility so that the natural product is flexible, and, because the fibers are able to move in the fatty matrix, they are able to adjust themselves to react to an applied stress and thereby to disperse the stress over several adjacent fibers.

Porosity is an extremely important property of natural leather for use in shoe uppers. The natural product has good breathability because almost half of its bulk is occupied by air distributed in extremely fine pores between fibers so that there is a minimum of large voids or empty spaces. These fine pores confer low bulk density and good thermal insulation. They permit the passage of water vapor through leather and yet, because they are so small, offer considerable resistance to the transmission of liquid water.

One of the most important properties of natural leather for use in shoe uppers is its ability to be deformed by the application of pressure and to retain substantially its deformed configuration when the pressure is removed. Thus, the natural product may be stretched to conform to the configuration of a last and it will retain substantially the shape of the last when the last is removed. This property, which is attributable to the plasticity of natural leather is referred to as set. Natural leather will assume a new set during the breaking in period of the shoe. When the shoe is worn the leather will deform from its lasted shape in response to the stresses applied in wear and assume and retain the configuration of the foot. Such synthetic products as have heretofore been described are especially deficient in this quality. Some of them will not even take the original set of the last, unless they are lasted under special conditions. Others, while they will take the set of the last will not take the set of the foot. Either they resist the deformation stresses applied by the foot during wear and too readily return to their original shape, or they do not retain the shape of the shoe and therefore become distorted. In the first instance, shoes made from such synthetic products, unless they are fitted with extreme care are initially uncomfortable each time they are worn. The discomfort continues during each wearing period until the shoes adapt to the feet. As soon as the shoes are taken off, they reassume their original shape and must be broken in again. This necessity for extreme care in the original fitting means that many more sizes should be made available to insure consumer comfort. This is a distinct disadvantage. In the second instance the shoe readily assumes the shape of the foot, but continues to stretch in all directions when subjected to various stresses. It does not return exactly to its prestressed condition, with the result that the shoe very quickly loses any semblance of its original shape.

The processes which have been proposed for the manufacture and use of the synthetic product have been difficult or inconvenient, requiring precise control of temperature, humidity or other process conditions. Accordingly, no relatively inexpensive, completely satisfactory technique for preparing supple sheet compositions having the desirable properties of natural leather has been described. Additionally, so far as is known, no leather substitute has yet been described which has the desirable physical properties of natural leather when formed into low density and low gauge materials designed to simulate kid leather or light weight calf leather.

The products, the preparation of which is described in the above-identified copending patent application 562,532 very closely approach the desiderata of natural leather. Generally speaking, the products are prepared by needling a fleece of fibers into a foam sheet and impregnating the resulting web with a solution of an elastomeric, polymeric filler material and depositing the solid impregnant or filler within the web either by the addition of a liquid which does not dissolve the elastomer and is miscible with the solvent of the elastomer solution, or by evaporating the said solvent.

Before describing this invention in detail it will be convenient to define certain of the terms which will be employed.

Fiber: Natural and synthetic materials of suitable denier, length and other dimensions such as polyesters, acrylics, polyamides, modacrylics, vinyls, cellulosics, wool, silk, etc. Inorganic fibers such as glass may be used, but the preferred fibers are organic fibers, most preferably synthetic organic fibers. They can be polyamides, such as polyhexamethylene adipamide (nylon 6,6) or polycaproamide (nylon 6); polyesters, such as polyethylene terephthalate or polydimethylcyclohexyl terephthalate; acrylics such as polyacrylonitrile; vinyls, such as polyvinyl chloride or polyvinyl alcohol; cellulosics such as rayon, etc., and wool. Mixtures of two or more fiber types may be employed.

As used herein, the term "fiber" includes tow, staple, continuous filament and similar fiber forms. The fibers may be present as yarns. They may be crimped (whether or not heat-set) or uncrimped. The fibers employed will generally have a denier between about 0.5 and 6 and preferably between 0.5 and 3. Fiber lengths of at least about ½ inch are desirable. Fibers in conventional textile lengths, e.g. up to three or more inches, are generally suitable for use in this invention.

Fleece: The structure formed by processing the fibers in the appropriate equipment including, for example, carding, cross laying, air laying, etc. The preferred fleeces for use in this invention are isotropic fleeces such as may be formed on air lay equipment. However, a cross-laid fleece in conjunction with other directional structures such as carded fleece, scrim, warp yarn and the like, can be used. Isotropic continuous filament structures are also suitable.

Foam: Relatively low density, porous, cellular, flexible, resilient materials, such as polyurethane foam.

Web: The product formed by combining the fleece and the foam as by needling the fleece into the foam. The webs of this invention are sometimes referred to herein for convenience as composite webs, because there are at least two fleece components.

Substrate: The product formed by depositing an elastomer throughout the web. The composite substrates of this invention are formed from the composite webs by elastomeric deposition.

The aforesaid patent application Ser. No. 562,532 describes the preparation of supple sheet compositions suitable for use as replacements for natural leather in which a fleece is placed on a flexible, uncompressed, cellular polyurethane foam sheet. The fibers of the fleece are forced into the sheet, preferably by needling, to produce a web. The web is compressed at a temperature and pressure sufficient to cause the web substantially to retain its compressed dimensions. The compressed web is then impregnated with a solution of an elastomeric filler material, preferably a polyurethane elastomer, and the elastomer is deposited throughout the web body either by evaporation of the solvent or by the addition of a solvent miscible liquid which is a non-solvent for the elastomer. The thus formed substrate is then further compressed.

The compressed substrate is finished by any of the procedures which will be described in more detail below to produce various products which can be employed as substitutes for natural leather in a variety of uses. If the substrate is to be finished for use as a shoe upper material, it may be coated on its outer surface with a microporous elastomeric layer which is breathable. This layer may be further coated with decorative or protective coatings. If the shoe upper material is to be simulated patent leather a flexible elastomeric coating is applied to the upper surface by spraying, roller coating, knife coating, or the like.

The uncoated products thus prepared have many of the desirable attributes of natural leather. They comprise supple sheet compositions or substrates containing a fiber network in which the fibers are not arranged in discrete substantially separate layers as in laminated structures, but are completely distributed in all dimensions throughout the whole of the composite body. Moreover, the fibers are not fixed in position, with the result that they are free to move slightly when the structure is subjected to stress, for example, the stress of lasting. The fact that the fibers in the products thus prepared are relatively, although not completely, restricted in their movement is apparent from the fact that the products can be elongated sufficiently to be lasted in accordance with the usual lasting techniques, but will resist further elongation. In fact, if stresses substantially higher than those usually associated with lasting of leather are applied, the products will rupture. This indicates that the fibers have reached the limit of their ability to move to neutralize stresses.

They may be further defined as breathable composite structures comprising an interlocking network of randomly oriented fibers and foam having a soft, resilient elastomeric filler material or impregnant dispersed throughout the networks substantially, although not completely, filling the the void spaces between the fiber and the foam. The compositions are similar to natural leather in structure in that they are not laminates, but integral structures in which the fiber portion is distributed throughout the whole cross-section. As in natural leather, the fibers are disposed in a soft, resilient body of cellular product and filler so that the fibers are not totally restricted in their movement and are free to move in a restricted manner in response to stress.

It has been discovered that the substrate prepared by the process generally described above, may be employed as a substitute for natural leather in many uses, but tend to be deficient as shoe upper materials because the inner or lower volume segment of the structure is not relatively compressible, compared with the rest of the structure. Thus, special care is required in order to produce shoes. The product does not have an acceptable density and compressability gradient because of the high pressures whih are required to develop modulus and other properties desirable in a leather substitute. The product is so highly compressed that it cannot be satisfactorily further compressed in the shoemaking operation. Therefore, the product is unable to accommodate to dimensional changes, with the result that there are surface defects such as described above.

The products described and claimed in this application are gradient density, gradient compressibility products which very closely approach natural leather in physical structure and properties. A special feature of the products of this invention is that, like natural leather, there is a gradual change in density and compressibility from the inner to the outer surface, rather than an abrupt change as in laminar products.

THE INVENTION

The composite substrates of this invention differ from the substrates described in the above-identified patent application principally in the structure of the web. In the previously described web all of the fibers in the web were randomly oriented and distributed with no predominant proportion of them lying in any particular plane or in any particular direction. They may be all of the same, or they may be a mixture of fibers. They may also be of the same denier, but are not necessarily so. However, no attempt is made to have a large proportion of the fibers in one particular plane of the web and lying predominantly in a particular direction.

In contrast, the composite web of this invention may be considered as one comprising the previously described web on the upper surface of which another fleece of additional fibers has been applied and integrated principally by mechanical bonding. The fibers of the second fleece are preferably finer than the fibers of the original fleece, but they may be of the same denier, or they may be more coarse. The structure of this second fleece is such that, while a large proportion of the fibers are randomly disposed, the largest proportion of them are essentially in the horizontal plane. The new composite web, then comprises a base web in which randomly oriented fibers are dispersed in interlocking networks throughout a foam, there being void spaces between the foam and the fiber. The base web is integrated, i.e. mechanically bonded for example by needling, to a top fleece composed of additional fibers which may be of the same denier as the fibers in the base web, but are not necessarily so, most of the fibers in the top fleece being oriented in a substantially horizontal plane.

While it might appear from the previous discussion that the composite substrates of this invention are laminates, such is not the case. The deficiencies of laminates are thus avoided. The upper fleece is sufficiently integrated with the lower fleece so that there is substantially no interface. Moreover, the elastomeric impregnant is distributed throughout both fleeces, and serves a function similar to a bonding agent. It should be pointed out that the interstices in the upper section of the composite substrate are smaller than the void spaces in the lower section. Accordingly, the larger proportion of the elastomer is disposed in the void spaces rather than the interstices.

The composite substrates of the invention are characterized by a gradient density and comprise a composite web, the lower portion of which is an interlocking, randomly oriented network of fibers in a foam, and the upper portion of which is a fleece bound to the lower portion and composed of additional fibers lying principally in a horizontal plane, the said composite web having a soft, resilient, elastomeric filler material dispersed throughout the lower and upper portion thereof which substantially, although not completely, fills the void spaces between the fiber and the foam in the lower portion and also substantially fills the interstices between the additional fibers in the upper fleece.

There is a gradient density in the composite substrates of this invention. The lower portion is less dense and more compressible than the upper portion. As a result of this increased compressibility there is markedly less tendency for the product to wrinkle or to show other defects when subjected to stress.

The top fleece serves an important function. Most of the fibers are in the horizontal plane. In the bottom fleece they are randomly disposed. As a result the fibers in the top fleece are more compactible than the fibers in the bottom fleece. Therefore, only a moderate amount of pressure need be employed in the preparation of the composite substrate to produce a leather-like material. As a result the bottom portion of the substrate is not completely compressed. This means that the completed product has a gradient compressibility and a gradient density and is more acceptable as a shoe upper material.

A particular advantage of the composite substrates of this invention is that the show-through problem associated with other substrates which have been suggested as shoe upper materials is minimized. Show-through arises when irregularities in the substrate become apparent through the decorative or protective coatings used on the substrate. The irregularity, which could for example be an especially coarse fiber, might be on the surface of the substrate or in the body thereof. In either event, when the material is stretched and compressed in the lasting operating the defect shows through the protective or decorative coating. In the composite substrates of this invention, the major proportion of the fibers in the top fleece are disposed horizontally with the result that they can be brought together more closely with relatively low pressures. This minimizes the possibility of surface irregularities in the substrate and also makes it possible to use coarser and less expensive fibers in the preparation of the bottom fleece.

The problem which has been defined a "show through" in this application is a well known, art recognized problem which has caused the demise of many materials previously proposed for use as shoe upper products. It is often referred to as "orange peeling." It is caused by "print through" of an uneven base layer when the leather substitute is subjected to heavy stretching, for example in the toe area during lasting.

The top fleece may be composed of one fiber or a mixture of fibers. The fibers may be synthetic or natural fibers. In one especially preferred aspect of the invention a fiber blend, usually containing only a pair of fibers, is employed, and one of the fibers is thermoplastic, that is, it softens under the processing conditions employed in the invention. The softened fibers bond to themselves or to other fibers in the blend at spaced apart points along the fiber length. This contributes to the dimensional stability of the product and also improves its modulus.

A special processing advantage which arises from the use of the top fleece in the products of this invention is that the compression conditions need not be as rigorous as those employed in preparing the products described in the above-identified application, Ser. No. 562,532. In fact, in certain embodiments of this invention the final compression step described in the previous application may be omitted.

Each of the components of the substrates of this invention contributes in a particular way to the final leather like properties of the product. The elimination of any one of them results in an unsatisfactory product. A substrate containing only fiber and foam would be deficient for some end uses since it would be easily deformed under stress and, on removal of stress, would tend to stay in the deformed conformation. With each new stress it would assume a new configuration. If the product were lasted it would readily assume the shape of the last. The shoe would readily conform to the shape of the foot. However, the various stresses occasioned by the wearing of the shoe would force it into new configurations, with the result that after only a short period of use the shoe would be completely deformed. The reason for this is that the foam alone is not capable of building enough resiliency into the product. The product has only a limited memory and is not capable of reassuming its approximate original configuration after the deforming stress is removed.

A product containing only fiber and elastomer would react in a different manner. It would be readily lasted, but when the last was removed there would be a strong tendency for it to return to its original configuration. A shoe made from this product would expand in response to the stresses of wear, but would return to its original configuration when removed from the foot. Thus, the shoe would never be broken in. The reason for this is that the elastomer has a substantially complete memory and tends to return to its original dimensions when a stress is removed.

Fibers by themselves have substantially no memory, but their presence in the compositions build in the desired physical properties of the leather like compositions such as tear strength, tensile strength, burst strength and the like.

A combination of elastomer and foam would not have any of the properties of natural leather to a useful degree.

In this invention the characteristics of the three components are properly balanced to produce products having properties simulating the properties of natural leather. Thus, products are produced which have the tensile strength, elongation burst strength, plasticity, transpiration, water vapor absorption, breathability and other physical characteristics including gradient density and internal compressibility of the natural product as well as the aesthetic properties such as appearance, break, accommodation, hand, suppleness, and the like. It has also been found that by varying the identity and relative quantity of the three components and the formulation procedure it is possible to prepare a variety of leather substitutes having the exact balance of physical and aesthetic properties appropriate to particular end uses.

The preferred cellular product for use in this invention is polyurethane foam because it is readily available, easy to work with, tough and abrasion resistant.

Flexible cellular polyurethanes as the term is commonly used in the art, are foams which give an ultimate elongation of at least about 100% at room temperature and have the ability to deform readily under load. Typical foams which are useful in the practice of this invention are those requiring a compression of about 3 to 100 pounds per 50 square inches to produce a 25% deflection, measurements being made on a two inch thick sample at 25° C. in accordance with ASTM test number 1564–59T for indent load deflection. The foam sheet will preferably have a tensile strength of between about 5 to 35 p.s.i., an ultimate elongation between about 100 and 400% and a tear strength of about 0.6 to 5 pounds per inch. The preferred foams will also have between about 25 and 100 cells per linear inch and a density of the order of about 0.8 to 6 pounds per cubic foot.

The flexible cellular polyurethane employed in the practice of this invention is prepared by the reaction of an organic polyisocyanate with an organic compound having at least two isocyanate-reactive hydrogen atoms. Preferably, the organic compound having at least two reactive hydrogen atoms will have a molecular weight of at least 200. It can be a polyalkylene polyether prepared by polymerizing an alkylene glycol or alkylene oxide. The useful polyethers include polyethylene glycol, polypropylene glycol, polytetramethylene glycol, copolymers of glycols with triols such as 1,2,6-hexanetriol or trimethylol propane, copolymers of two or more oxides, such as ethylene oxide-propylene oxide copolymers, etc. It can also be a polyester such as those prepared by reacting ethylene glycol, propylene glycol, tetramethylene glycol, hexanetriol, trimethylol propane and polymers thereof with dicarboxylic acids such as those derived from castor oil, tall oil fatty acids, and other fatty acids; or dicarboxylic acids such as adipic acid, succinic acid, maleic acid, phthalic acid, etc.

Useful organic polyisocyanates include arylene diisocyanates or triisocyanates, typically tolylene diisocyanate, phenylene diisocyanate, tolylene triisocyanate, benzidine diisocyanate, mesitylene diisocyanate, durylene diisocyanate, naphthalene diisocyanate, etc.; aliphatic polyisocyanates, typically hexamethylene diisocyanate 4,4'-methylene bis-cyclohexyl isocyanate, decamethylene diisocyanate, etc. The preferred polyisocyanates are the arylene diisocyanates and particularly the commercially available 80,20 mixture of 2,4 and 2,6-tolylene diisocyanate.

The cellular polyurethanes are prepared by reacting an organic polyisocyanate, typically tolylene diisocyanate with the organic compound having reactive hydrogen atoms in the presence of a gas-producing agent. The gas-producing agent may be water, which reacts with the iso-cyanate to form carbon dioxide, or it may be an inert, volatile liquid or a gas. Additional components such as cell-modifiers, emulsifiers, dyes, etc. may also be present.

The preferred cellular polyurethanes are flexible cellular polyether or polyester urethanes. They may have an open-cell or closed-cell structure, but open cells are preferred. The term "open-cell" means that at least about 90% of the cells are interconnecting and free of cell-separating membranes. Open-cell cellular polyurethanes can be prepared by suitable foaming techniques or by chemically, mechanically or explosively opening the cells of a closed cell foam.

After the foam is prepared, generally in the form of a bun, it is formed into sheets suitable for use in this invention by any suitable technique such as slicing, splitting or peeling the bun. The thickness of the sheet may vary over a wide range depending upon the proposed ultimate product. For example, sheets from 0.020 to 1.5 inches may be employed. For shoe upper products the selected sheet thickness will normally be from about 0.020 to 0.125 inch.

While foamed polyurethane is preferred, other foams having equivalent properties such as polyethylene, foamed rubber lattices, silicone foams and various vinyl foams can be used.

The fiber-foam combination for use in preparing the lower portion of the composite web of this invention are prepared by placing a fibrous mat or fleece on one side of a cellular sheet, preferably a polyurethane sheet and physically forcing a plurality of fibers through the sheet. Preferably, the fleece employed is a non-woven fleece in which the individual fibers have sufficient freedom of movement so that they can be forced into the foam to achieve the desired degree of penetration. Non-woven fleeces of comparatively loose construction are favored. Such fleeces include loosely knitted yarn structures, those produced by carding or air-laying, etc. Fleeces having a weight from about 2 ounces per square yard to 24 ounces per square yard are generally suitable. The presently preferred fleeces are air-laid, non-woven products having a weight of about 3 to 10 ounces per square yard. Two or more superimposed fleeces may be used.

The fibers used to prepare the fleece for the upper portion of the integrated web of this invention may be any of the fibers mentioned above. Mixed fibers may be used in either portion. Generally, the denier of the fibers in the upper fleece will be from about 0.5 to 6, preferably from 0.3 to 2.

The fiber lengths in both portions may generally be the same. Conventional fiber lengths are suitable. Fiber lengths of at least one half inch are desirable.

The composite webs of this invention, while principally useful in the preparation of synthetic leathers are also useful for a variety of other purposes. They have good insulating and cushioning properties and may, for example, be employed as interlinings for cold weather clothing, as padding for bras, quilts and blankets, as carpet backing or as scouring and polishing pads for home use.

Useful fillers of stuffing materials which may be employed in this invention include a wide variety of soft, resilient, thermoplastic or thermosetting materials including, for example, polyurethanes and copolymers of butadiene and acrylonitrile. Polyurethane elastomers prepared from various polyethers or polyesters by reaction with polyfunctional isocyanates are especially preferred. They are prepared by known procedures utilizing the same basic chemicals utilized in the production of polyurethane foams as described above, but under conditions such that they normally do not foam. They may contain various surfactants, lubricants, and the like. They are a well known class of polymeric materials and are readily available from a number of commercial producers. Usually, they are commercially available in organic liquids such as dimethylformamide.

In accordance with the presently preferred process of this invention, a fibrous fleece is placed on a flexible, uncompressed, cellular polyurethane foam sheet and the fibers of the fleece are physically forced into the foam sheet, as by needling to form a web in which the fibers are randomly oriented. This web is a composite structure which may be characterized by having a volume segment which is predominantly foam and a volume segment which is predominantly fiber. These are referred to respectively, as the fiber side and the foam side. It is, however, in no sense a laminate.

A second fleece prepared from additional fibers is then placed on the fiber side of the base web, and a portion of the additional fibers is forced into the base web, preferably by needling so as to form a composite web in which the top fleece is mechanically bonded to the bottom web. In the composite web the bond holding the top fleece in structure is sufficiently strong so that it cannot be broken without destroying the composite web. The interface substantially disappears.

The composite web is then compressed at elevated temperature and pressure so as to densify the product and increase its dimensional stability and other physical properties. This treatment, which is referred to herein for convenience as a pressure treatment, is conducted at a temperature of from about 250° F. to 375° F. at a pressure of from about 5 to 100 pounds per square inch during a period of from about 20 seconds to 5 minutes. The preferred conditions for commercial efficiency are 300° F. to 325° F. at 10 to 30 pounds per square inch for 45 to 90 seconds.

Both compressed and uncompressed composite webs are useful for the insulating and cushioning properties described above.

The compressed composite web is impregnated with a solution of the filler material deposited in the web. This will usually be accomplished by evaporation of the solvent, or by the addition of miscible liquid in which the elastomer is not appreciably soluble.

The composite substrate with the deposited elastomeric filler may then optionally be subjected to a further treatment which for convenience herein is described as a heat treatment. If a heat treatment is utilized, it is a very mild treatment carried out at a temperature of from about 300° F. to 350° F. at from about 2 to 5 pounds per square inch pressure for from about 10 to 30 seconds. If only one fiber is used in the top fleece, or if a non-thermoplastic fiber pair is employed, the heat treatment conditions may be the same as the pressure conditions described above, i.e. from about 250° F. to 375° F. at from about 5 to 100 pounds per square inch for from about 20 seconds to about 5 minutes.

The thus formed product may be broadly defined as a three component system in which there are interlocking networks of fiber and foam with a soft resilient filler dispersed therein. The filler does not completely fill all of the spaces between fiber and foam with the result that the product has breathability and moisture vapor transmission properties similar to natural leather.

The composite substrates may be more fully defined as breathable, fibrous sheet compositions characterized by a gradient density increasing from bottom to top comprising a base web which is an interlocking network of randomly oriented and distributed fibers in a polyurethane foam with void spaces therebetween, a top fleece mechanically bonded to the surface of said base web comprising additional fibers, the additional fibers having fine interstices between them and being predominantly in a horizontal plane; and a soft resilient elastomeric impregnant or filler which substantially, but not completely fills the void spaces and the interstices.

The various process steps will now be discussed in somewhat more detail.

For the preparation of the lower portion of the composite web, the fleece is physically placed on the cellular sheet and a plurality of fibers are physically forced into the sheet, preferably by needling. The degree of penetration of the fibers will be sufficient to bind the fibers and foam into an integrated unit. The degree of penetration required to do this will vary with the thickness of the sheet. Sufficient penetration will generally be achieved if at least about 50% of the penetrating fibers penetrate at least about 75% of the sheet thickness and at least some of the fibers completely penetrate the sheet. It is preferred that at least 10% of the fibers completely penetrate the sheet. These penetrating fibers are then forced back into the sheet, and preferably completely through the sheet. The product is then preferably, although not necessarily lightly needled from the original side to force these ends back into the sheet. This procedure produces a product in which there are very few fiber ends projecting from either side of the sheet. Instead, such fibers as do protrude are exposed as loops.

Any suitable technique for forcing the fibers through the foam may be employed. The preferred method is needling the fibers into the foam by passing a plurality of needles through the fleece and thereafter into the cellular polyurethane sheet. Needling is convenient, rapid, and minimizes the physical damage of the foam. Conventional needling devices such as needle looms can be used. Preferably, the needles used will be relatively fine needles having a number of barbs which snag the fibers and force them into and through the foam.

In order to obtain the desired integrated structure the fleece is first needled into the foam from one side at a penetration density of at least about 250 penetrations per square inch. Preferably, the total penetration density will be between about 500 and 1500 pentrations per square inch. The product thus produced is then needled from the other side at a penetration density of at least about 100 penetrations per square inch. If a third needling operation is employed, the penetration density is again at least about 100 and preferably 200 to 1500, but the needles are adjusted so that the depth of penetration is insufficient to force the fibers completely through the sheet. Penetration densities in the upper end of the described ranges are preferably employed with the thicker cellular sheets, and lower penetration densities are preferably employed with thinner cellular sheets.

The top fleece is then placed on the fiber side of the thus formed base web, and needled at a density of about 500 to 1500 penetrations per square inch as described above. The needles are set so that only minimum penetration takes place. The mechanical bond need not be formed by needling, but other equivalent procedures such as felting may be used.

The product thus produced is then compression treated as described above. Compression devices such as nip rollers, rotary presses, platen presses, and the like, may be employed. The compression devices will normally be heated. The same devices may be utilized in the optional heat treatment.

The composite web product obtained from the compression step is a supple integrated product in which the fibers are held apart by the foam. Its exact composition will depend upon the original thickness and weight of the foam and fleeces used as starting components. Typically, the composite web may comprise about 10% to 18% by weight fibers, and about 20% to 90% foam based on the total weight.

The integrated composite web is next impregnated with the selected filler. Any suitable impregnation technique can be employer. The web may be simply soaked in a solution of the elastomer. Alternatively, it may be passed through a set of compression rolls in a bath of the elastomer. Vacuum techniques in which the solution of the elastomer is applied to the web by a knife coater or similar device and then sucked into the web under vacuum to effect substantially complete penetration, may also be employed.

The elastomer may be deposited in the web by treatment with a liquid which is miscible with the liquid carrier for the elastomer but in which the elastomer is not appreciably soluble, for example, water. This causes the elastomer to precipitate from the solution. Precipitation may be conveniently effected by soaking the impregnated product in water, by spraying it with water or by subjecting it to a humid atmosphere. Alternatively, the elastomer may be deposited by heating the impregnated product, for example, in an oven, to evaporate the solvent. The baking temperature employed should be high enough to facilitate the removal of the solvent, but not high enough to cause the elastomer to flow. In either event, the product is breathable, i.e., it has good water vapor transmission characteristics. The water wash technique produces a product which is somewhat more breathable than the baking technique since the filler in the product produced by the former procedure is itself a cellular structure comprising an interconnected series of micropores. The fact that the product is breathable no matter which technique is utilized clearly establishes that there are void spaces in the composite web and that these spaces are not wholly filled in the substrate. Substrates prepared by the waterwash technique generally have better aesthetic properties, such as hand, break accommodation, etc., and this procedure is preferred where those qualities are important in the end use of the product.

The amount of dry elastomer added is from about 30 to about 70% by weight. The fiber content of the resulting substrate may vary from about 5 to 60% by weight and the foam content from about 5 to 60% by weight, all percentages being based on the total weight of the composition.

The substrate thus produced is similar in structure to natural leather. It has many of the physical and aesthetic properties of natural leather including hand, accommodation, drapability, etc. It may be buffed on one or both sides to improve its appearance, and/or other aesthetics.

The weight of the top fleece is typically from about 10% to about 25% of the total weight of the composite substrate. The thickness of the fleece may vary within rather wide limits, and the particular thickness will normally be selected so that it will be at least sufficient to mask any defects in the bottom web. This will depend in great measure on the composition of the base web and the proposed ultimate use of the product.

If a fiber blend, one member of which is thermoplastic is used in the top fleece, the weight of thermoplastic fiber which can be usefully employed varies with the denier of the fibers in the fiber blend. With the usually commercially available fibers in the usual denier range, the weight of thermoplastic fiber in the top fleece will be from about 15% to about 50% based on the total weight of fibers in the fleece.

Typical thermoplastic or heat-sensitive fibers which can be used in this invention include polyvinyl chloride fibers such as Vinyon, polyesters such as Fortrel, acrylics, olefins, modacrylics, acetates and tri-acetates.

While the preferred method of achieving spaced-apart bonding is by the utilization of a thermoplastic fiber, other techniques can be employed. For example, low melting particles such as polyethylene may be applied to the surface of a composite web and melted by the application of infra-red heat. Preferably, the particles are distributed into the body of the fleece before melting, for example by mechanical agitation or the application of pressure. They could also be forced into the fleece by high pressure dry spraying. This would be followed by the pressure step described above. Alternatively, a low melting polymer could be sprayed on the top surface of the composite web, and the solvent evaporated prior to the compression step. Salt bonding techniques can also be used.

For commercial use, especially when intended for use as a shoe upper material the composite substrates of this invention will be coated with an elastomer layer, often referred to as a grain layer. A number of techniques are available for the deposition of the grain layer. For example, a polyurethane elastomer of the class described above can be dissolved in a solvent such as dimethyl formamide and the solution sprayed on to the substrate. The wet surstrate is then sprayed with water or exposed to a water wet atmosphere to precipitate the elastomer. The process may be repeated several times to build up grain layer of suitable thickness.

The invention may be better understood by reference to the attached figure which is a photomicrograph of a product of the invention. The various segments of the product, which includes a decorative coating, are labeled.

The following non-limiting examples are given by way of illustration only.

EXAMPLE I

Fibers of 100% 1.5 denier by 1.5 inch nylon 6,6 are air-lead on a webbing machine to produce a fleece of 3 ounces/yard $^2$. This fleece is integrated with a 0.025 inch thick sheet of polyester polyurethane foam as follows:

(a) 600 penetrations per square inch from the fiber side (300 penetrations at $11/16$ inch depth, 300 penetrations at $9/16$ inch depth).
(b) 600 penetrations per square inch from the foam side (300 penetrations at $1/2$ inch depth, 300 penetrations at $7/16$ inch depth).

The fleece, with the fiber side up is then brought into contact with a newly laid fleece of a 2:1 blend of 1.5 denier by 1.5 inch nylon 6,6 and 1.5 denier by 1.5 inch polyester (Fortrel type 450), and again passed through a needle loom with the fiber side up. The penetration density is 600 penetration per inch a $9/32$ inch depth.

The resulting composite web is compressed in a rotary press during a dwell time of one minute at a belt pressure of five pounds per square inch while applying heat to the fiber side at 315° F., to bond the ester to the nylon.

The composite web is then impregnated with a polyurethane elastomer solution in dimethyl formamide having a 20% solids concentration, and passed through metering rolls so that the total wet add on is 500%.

The impregnated web is next passed into a water coagulation bath equipped with rollers to move it along so as to deposit the elastomer in the composite web. The product is washed with water by passing it through a second water bath similarly equipped with rollers, and finally dried.

The dried product is coated with a polyurethane elastomer by first coating it on the fiber side with the elastomeric solution and then passing it through a water bath and drying. Similar results are obtained when the polyurethane foam is replaced with polyethylene foam.

EXAMPLE II

The procedure of Example I is repeated except that the nylon-polyester blend in the top fleece is replaced with a rayon web of one ounce per square yard in which the fibers are 0.75 denier by 1.5 inch.

Before the coating layer is applied, the composite substrate is subjected to a heat treatment at 300° F., at a pressure of 80 pounds per square inch for three minutes to effect bonding.

EXAMPLE III

The procedure of Example I is repeated replacing the nylon-polyester blend with 1.5 ounce per square yard nylon 6,6 in which the fibers are 1.5 denier by 1.5 inches. Before the elastomer layer is impregnated, the composite web is sprayed with a polyvinyl chloride latex having a 10% solids composition. The spray treatment is at sufficient pressure to insure penetration into the top fleece. Bonding is effected during the pressure treatment.

EXAMPLE IV

The procedure of Example III is repeated replacing the polyvinyl chloride latex with a salt bonding composition of zinc chloride in water. The fibers of the top fleece are bonded together by passing the product through the nip of pressure rolls while it is wet with the zinc chloride solution.

EXAMPLE V

The procedure of Example III is repeated except that the polyvinyl chloride latex is replaced with dry polyethylene powder. Bonding is effected by passing the composite substrate through an infrared heating zone to melt the polyethylene.

What is claimed is:

1. A composite web characterized by a gradient density such that the density increases from the bottom to the top thereof comprising:
    (a) a base web which is an interlocking network of randomly oriented and distributed fibers in an organic polymeric foam which void spaces therebetween, and
    (b) a top fleece needled to the top surface of said base web and comprising fibers in addition to those in the base web, said additional fibers having fine interstices therebetween, and being predominantly in a horizontal plane.

2. A composite web of claim 1 in which the foam is polyurethane.

3. A composite web of claim 1 further characterized in that the additional fibers comprise a fiber blend.

4. A composite web as in claim 3 in which the fibers of the fiber blend are bonded together at spaced apart points.

5. A composite web as in claim 4 in which one member of the fiber blend is a thermoplastic fiber.

6. A composite web of claim 2 wherein said polyurethane foam is a polyester or polyether based polyurethane.

7. A composite web of claim 1 wherein said randomly oriented fibers are synthetic fibers, natural fibers, or mixtures thereof.

8. A breathable, supple, fibrous sheet characterized by a gradient density such that the density increases from the bottom to the top thereof comprising:
    (a) a base web which is an interlocking network of randomly oriented and distributed fibers in an organic polymeric foam with void spaced therebetween.
    (b) a top fleece needled to the surface of said base web and comprising fibers in addition to those in the base web, said additional fibers having fine interstices therebetween, and being predominantly in a horizontal plane, and
    (c) a soft, resilient, elastomeric impregnant which substantially, but not completely fills said void spaces and said interstices.

9. A sheet as in claim 8 wherein the foam is polyurethane.

10. A sheet as in claim 8 further characterized in that the additional fibers compirse a fiber blend.

11. A sheet as in claim 10 in which the fibers of the fiber blend are bonded together at spaced apart points.

12. A sheet as in claim 10 in which one member of the fiber blend is a thermoplastic fiber.

13. A sheet as in claim 9 wherein said polyurethane foam is a polyester or polyether based polyurethane.

14. A sheet as in claim 8 wherein said randomly oriented fibers and said additional fibers are synthetic fibers, natural fibers or mixtures thereof.

15. A sheet as in claim 8 including a grain layer.

References Cited

UNITED STATES PATENTS

| | | | |
|---|---|---|---|
| 3,284,274 | 11/1966 | Hulslander et al. | 161—159 |
| 3,387,989 | 6/1968 | West et al. | 161—159 |
| 3,477,898 | 11/1969 | Buff et al. | 161—160 |
| 3,355,535 | 11/1967 | Hain et al. | 161—159 |
| 3,591,444 | 7/1971 | Hoppe | 161—161 |
| 3,655,471 | 4/1972 | Healy et al. | 156—48 |

WILLIAM J. VAN BALEN, Primary Examiner

U.S. Cl. X.R.

156—148; 161—160, 166, 190, Digest 2